United States Patent [19]

Lauer et al.

[11] 3,711,565

[45] Jan. 16, 1973

[54] PROCESS FOR STABILIZING DIENES

[75] Inventors: Hubert Lauer; Bernhard Schleppinghoff, both of Dormagen, Germany

[73] Assignee: Erdoelchemie Gesellschaft mit beschrankter Haftung, Cologne, Germany

[22] Filed: Oct. 18, 1971

[21] Appl. No.: 190,260

[30] Foreign Application Priority Data

Oct. 21, 1970 Germany.....................P 20 51 548.4

[52] U.S. Cl. ................260/666.5, 260/681.5, 203/8
[51] Int. Cl................................................C07c 7/18
[58] Field of Search .........260/666.5, 681.5; 203/8, 9

[56] References Cited

UNITED STATES PATENTS 3,523,141 8/1970 Sakashita et al...................260/666.5
2,787,634 4/1957 Coover, Jr. et al................260/465.9

Primary Examiner—Paul M. Coughlan, Jr.
Assistant Examiner—J. M. Nelson
Attorney—Burgess, Dinklage & Sprung

[57] ABSTRACT

Aliphatic dienes such as butadiene and isoprene containing nitrogen containing polymerization inhibitors are stabilized against accelerated dimerization by adding thereto iron complex-forming compounds.

6 Claims, No Drawings

PROCESS FOR STABILIZING DIENES

BACKGROUND

The invention relates to a process for the stabilization of aliphatic dienes which contain a high proportion of dimers as a result of having been prepared with the aid of polymerization inhibitors from the class of nitrogen oxides, compounds which split off nitrogen oxide or systems which contain alkali metal nitrites, substances which give rise to iron complex compounds being used as stabilizers for the process.

The monomers butadiene and isoprene are nowadays obtained mainly from the corresponding $C_4$ and $C_5$ hydrocarbon mixtures supplied from cracking units and using known processes with selective solvents such as acetonitrile, dimethylformamide of N-methylpyrrolidone. Owing to the high temperatures of 100°C – 150°C employed, uncontrollable polymerization of butadiene and isoprene occurs in these processes and deposits and blockages are formed in the apparatus which are made of iron. An efficient inhibitor system is therefore essential for the economical working of such units. Polymerization inhibitors such as NO or compounds which split off NO or systems which contain alkali metal nitrites are found to be satisfactory but the finished products butadiene and isoprene obtained by this process and with the aid of these inhibitors undergo substantial dimer formation of up to 1 percent during storage and transport.

In the case of pure diene, dimer formation is considerably less and depends solely on the storage temperature and time. Thus, for example, at temperatures of 20°C – 30°C, only a few hundred ppm of the pure monomers are converted into the corresponding dimers in the course of 2 weeks.

Dimerization of the pure aliphatic dienes butadiene and isoprene is always a serious disadvantage because when the monomers are subsequently treated to convert them into specific polymers, the dimers do not take part in the polymerization process and therefore constitute a loss of material. In addition, the dimers are built into the polymers in the polymerization process and confer undesirable properties on the polymers.

SUMMARY

It has now been found that aliphatic dienes which are produced in the usual iron or steel plants by processes in which NO or compounds which split off NO or systems which contain alkali metal nitrites are used as polymerization inhibitors can be stabilized very easily and satisfactorily by adding iron complex-forming compounds to the dienes.

DESCRIPTION

The dienes which are to be stabilized are those with four to six carbon atoms and especially those with four or five carbon atoms and preferably butadiene and isoprene.

The following iron complex-forming compounds may be used for the process according to the invention, namely: isonitriles (see Angewandte Chemie 74, p. 9, 1962; Angewandte Chemie International Edition, vol. 1, p. 8, 1962; Neue Praparative Methoden der organischen Chemie, Publishers Chemie Weinheim, Bergstrasse, vol. 4, p. 1 et seq.), thioglycolic acid, $\alpha,\alpha'$-dipyridyl, phenantroline, 2-nitroso-1-naphthol-4-sulphonic acid and 8-hydroxy quinoline-7-iodo-5-sulphonic acid, but preferably compounds which are capable of supplying cyanide ions, especially potassium cyanaide and sodium cyanide. The stabilizers are preferably used in the form of their aqueous solutions.

They may be introduced into a washing or distillation column or directly into the storage tank. Their introduction into a distillation column, e.g. through the intake pipe of the reflux pump, is advantageous.

The compounds used according to the invention are added in quantities of 0.1 to 500 ppm by weight (parts per million), preferably 1 to 50 ppm by weight. Owing to the relatively small quantities of stabilizers used, they may be introduced directly into the storage tank if thoroughly mixed, without affecting the purity of the dienes. In such cases, the point at which they are fed in may be the intake pipe of the circulating pumps. The stabilizers should of course be added in the form of very concentrated aqueous solutions.

Dienes which have been stabilized by the process according to the invention are eminently suitable for the preparation of polymers and copolymers.

Example 1

A 2 percent by weight aqueous sodium cyanide solution (1 ppm by weight based on the quantity of butadiene produced) was added as a stabilizer at the final stage of distillation of a butadiene recovery plant (inhibitor: sodium nitrite). The sodium cyanide solution was added to the reflux of the column. The increases in dimer content during storage of butadiene distilled in this column with and without the addition of cyanide are compared in the following table:

|  | Dimer - content | |
|---|---|---|
|  | after 5 hours | after 2 days |
| with the addition of NaCN | 0.01% | 0.02% |
| without the addition of NaCN | 0.15% | 0.9 % |

The slight increase in dimer content after the addition of NaCN is due to thermal dimerization.

Example 2

The experiment was carried out as in Example 1 but with different stabilizers, e.g. $\alpha,\alpha'$-dipyridyl, phenantroline, thioglycollic acid and phenyl isonitrile. The increase in dimer content during storage of the butadiene distilled in the column after the addition of different stabilizers is shown in the following table:

| Stabilizer | Concentration (ppm by weight) based on the quantity of diene | Dimer content after 2 days % by weight |
|---|---|---|
| Blank (without additive) | — | 0.49 |
| $\alpha,\alpha'$-dipyridyl | 20 | 0.02 |
| Phenantroline | 20 | 0.02 |
| Thioglycollic acid | 20 | 0.07 |
| Phenyl isonitrile | 20 | 0.03 |

The experiments show that the complex-forming compounds used according to the invention effectively prevent catalytic dimerization.

Example 3

The stabilizers shown below were added to the column reflux in the final distillation stage of an isoprene recovery plant (inhibitor: sodium nitrite). The increases in dimer content during storage of isoprene distilled in the column after the addition of different stabilizers are shown in the following table.

| Stabilizers | Concentration (ppm by weight) based on the quantity of diene | Dimer content after 2 days % by weight |
|---|---|---|
| Blank (without additive) | — | 0.3 |
| $\alpha,\alpha'$-dipyridyl | 50 | 0.09 |
| Phenantroline | 50 | 0.09 |
| Thioglycollic acid | 50 | 0.13 |
| NaCN | 50 | 0.05 |
| Phenyl isonitrile | 50 | 0.06 |

Here again dimerization is prevented by the complex-forming substances according to the invention.

What is claimed is:

1. Process for the stabilization of aliphatic dienes containing nitrogen containing polymerization inhibitors against accelerated dimerization in the presence of iron which comprises adding thereto iron complex forming compounds selected from the group consisting of phenantroline, 2-nitroso-1-naphthol-4-sulphonic acid, 8-hydroxy quinoline-7-iodo-5-sulphoic acid, $\alpha,\alpha'$-dipyridyl, thioglycollic acid, phenyl isonitrile and compounds which are capable of supplying cyanide ions as stabilizers.

2. Process of claim 1 wherein the aliphatic dienes are butadiene and isoprene.

3. Process of claim 1 wherein the compounds capable of supplying cyanide ions are sodium cyanide and/or potassium cyanide.

4. Process of claim 1 wherein the stabilizers are added to the washing or distillation columns of plants used for the recovery of butadiene, dimethyl butadiene and isoprene or to the storage tanks of the dienes obtained in these plants.

5. Process of claim 4 wherein the stabilizers are added in concentrations of 0.1 to 500 ppm by weight based on the amount of dienes which are to be stabilized.

6. Process of claim 5 wherein the stabilizers are added in conentrations of 1–50 ppm by weight based on the dienes which are to be stabilized.

* * * * *